Patented Aug. 20, 1929.

1,725,648

UNITED STATES PATENT OFFICE.

LESTER KIRSCHBRAUN, OF LEONIA, NEW JERSEY.

EMULSION PRODUCT.

No Drawing.  Application filed April 15, 1927. Serial No. 184,072.

This invention relates to improvements in the production of dispersions and the product resulting therefrom, and more particularly relates to the production of bitumen-pitch base dispersions treated to prevent injury thereof when the dispersion is subjected to low temperature conditions.

Observations indicate that when dispersions of the type here referred to are subjected to freezing conditions, the dispersed particles are forced together under pressure or gather into clusters or flocs, or at least approach each other so closely as to exhibit a tendency to adhere to one another. The cause of this flocculating action cannot be stated with certainty, but it appears that it may be ascribed to the pressures set up and exerted by the freezing of the aqueous phase of the dispersion. The extent of this flocculation or agglomeration varies in accordance with the character of the dispersed material as well as the nature of the dispersing agent, and is, of course, influenced also by the degree of solidification of the aqueous phase which takes place when the mass is subjected to a given freezing temperature. When the forces giving rise to the flocculation of the particles are negligible, or only of sufficient intensity or duration to cause a minor amount of flocculation, it is generally possible to restore the particles to their original dispersed condition by gentle agitation or equivalent operation. When, however, the conditions are such that flocculation has proceeded to a point where the particles have agglomerated or coalesced into aggregates of considerable size, it is very difficult, and, in most instances, no longer possible, to redisperse the particles and restore the mass to its original condition. In the latter event the dispersion may be said to be broken down, and in such condition is unfit generally for use. It is obvious that any tendency for the dispersed particles to flocculate may be eliminated by so treating the dispersion that the aqueous phase thereof will be prevented from freezing. While this procedure is effective, it is nevertheless expensive, inasmuch as relatively large quantities of treating material are necessary to produce the requisite depression of the freezing point of the aqueous phase.

In accordance with the present invention I do not aim to prevent the aqueous phase from freezing; on the contrary, I concern myself with so treating the dispersion that the aqueous phase may, and probably will, freeze when subjected to low temperatures, but the freezing action will have been rendered incapable of causing flocculation or otherwise injuriously affecting the dispersion so as to render the same unsuitable for use. Accordingly, my invention is directed toward the treatment of the dispersion in a manner which, while not necessarily preventing freezing of the aqueous vehicle, will nevertheless exert a deflocculating action on the dispersed particles sufficient to prevent them from agglomerating or gathering together so closely as to exhibit a tendency to adhere to each other. The action attainable in carrying out the invention in accordance with any one of the procedures hereinafter to be more fully described, is generally sufficient to counteract the flocculating influences set up when the dispersion has been subjected to a temperature sufficiently low to cause freezing of its aqueous phase. By thus effectively eliminating the occurrence of flocculation, the dispersion may be subjected to temperatures sufficiently low to cause freezing of the aqueous vehicle, and yet permit the mass to be subsequently thawed out and rendered suitable for use.

In practicing the invention I may treat any dispersion of the type hereinafter indicated. As an illustration, I may produce a dispersion in the manner described in my issued Patent No. 1,615,303, January 23rd, 1927, and then treat the same to carry out the principles of the present invention. It should be understood, however, that the invention is applicable to dispersions other than those produced by the methods described in my aforesaid patent, and may be utilized in the treatment of any dispersion irrespective of the nature of the binder or the character of the dispersing means. The material dispersed may, for example, be any solid or semi-solid fluid bituminous substance and may include asphalt, either of the natural or artificial variety, coal tar pitch, vegetable or animal pitches, paraffine, resins, rubber or the like, or suitable mixtures of these as desired. In certain instances it may be desirable to disperse a fluxed material, and in such cases, any suitable and well known fluxing agent may be combined with the selected binder before effecting the dispersion.

The dispersive media may comprise any one of a large class of substances such as clay-like material, colloidal oxides, hydroxides, metallic silicates and the like, or suitable combinations of these materials.

In one mode of carrying out my present invention, I may add to the finished dispersion certain salts which may be described as electrolytes, and which function to exert a protective effect upon the dispersed particles, sufficient to prevent them from being agglomerated and coalesced by the freezing of the aqueous phase upon subjection of the dispersion to freezing temperatures. For this purpose I have employed such salts as lithium chloride, trisodium phosphate and ammonium carbonate, although it should be understood that other salts will readily suggest themselves, and in resorting to their use it will only be necessary to determine, by trial, the amount required to produce the desired results with any particular dispersion at hand. When using lithium chloride for example, a quantity approximating less than 1% and preferably about 0.75% on basis of weight of the dispersion, has been found sufficient to produce the necessary amount of protection in a dispersion of asphalt having melting point of about 110 degrees F.

As another illustration, sodium chloride in proportions ranging above 0.5% and less than 1.5% has been found capable of affording sufficient protection to enable the mass, after solidification of the aqueous medium, to be thawed out without the occurrence of particle agglomeration. Illustrating still further, sodium fluoride in about the same proportions as sodium chloride, may be used with equally satisfactory results.

As still another example of treatment with deflocculating salts, I may cite the use of trisodium phosphate in quantities varying from 0.05% to 0.75% on the basis of weight of dispersion treated, although it may be stated that the larger proportions apparently cause the dispersion to be thinned out upon being thawed, and hence the use of this salt may be objectionable in those instances where a thinning out of the dispersion is not desired.

A modification of this type of operation may be carried out by treating the dispersion with a solution of lithium chloride in alcohol. When adopting this procedure, the lithium chloride in quantities ranging between 0.25% and 0.50%, may be dissolved in relatively small amounts of alcohol, for example, about 1.5% or less on the basis of weight of the dispersion, and the solution employed as the treating agent.

A second type of treatment for the purpose with which the present invention is concerned, may be defined as treatment with organic substances. Some of these are normally liquids, while others are in a solid state at normal temperatures. Representative of the first class of these substances, aniline has been employed to advantage in carrying out the present invention. Thus, with a dispersion containing relatively soft asphalt, of say 110° F., melting point, in the disperse phase, aniline in proportions ranging from 0.05% to 0.75% has been found to give highly satisfactory results.

Illustrative of solid organic materials which have been utilized in this connection, I may name a non-electrolyte such as casein. This substance dissolved in water with an appropriate amount of alkali, for instance ammonium hydroxide, has been found to provide a sufficient protective action when employed in quantities ranging from ½% to 10%.

In another mode of carrying out the present invention, there may be used a mixture of alcohol with casein dissolved in a minimum amount of ammonia, the alcohol being either pre-mixed with the casein solution prior to the addition of the same to the dispersion, or the alcohol and the casein dissolved in ammonia may be added separately to the dispersion. The proportions however, should be preferably such that the casein will comprise ½% more or less, and the alcohol about 2% more or less on the basis of weight of the dispersion.

It has been stated above that the selected reagent is added to the completed dispersion. While the dispersion may be said to be complete in the condition in which it issues or is withdrawn from the dispersing instrumentality, nevertheless, it is found in actual practice, that it is necessary to bring the dispersion to a more fluid consistency. This can be done by the addition of water and it should therefore, be obvious, that the treatment in accordance with the present invention may take place either before, during, or after the addition of such water. On the other hand, when it is desired to decrease the amount of diluent necessary to reduce the viscosity of the dispersion, the latter may be subjected to a beating or whipping action as described in my issued Patent No. 1,616,904. In such case, the selected treatment may be used either before or during the beating or whipping action, or after the consistency of the dispersion has been otherwise converted into a more fluid form.

I claim as my invention:

An aqueous dispersion comprising bitumen-pitch particles as the dispersed phase and water as the continuous phase thereof, and containing in the external phase alcohol in quantities not greater than 1.5% and small quantities of a deflocculating electrolyte, said quantities of alcohol and electrolyte being insufficient to prevent freezing of the dispersion at temperatures substantially below 0° C., but sufficient to prevent injury of the emulsion due to such freezing action as does take place therein at said temperatures.

In testimony whereof I affix my signature.

LESTER KIRSCHBRAUN.